P. SPRENGER & A. TSCHUDI.
CASEIN CALCIUM AND PROCESS FOR PRODUCING THE SAME.
APPLICATION FILED AUG. 27, 1913.
1,087,515.
Patented Feb. 17, 1914.
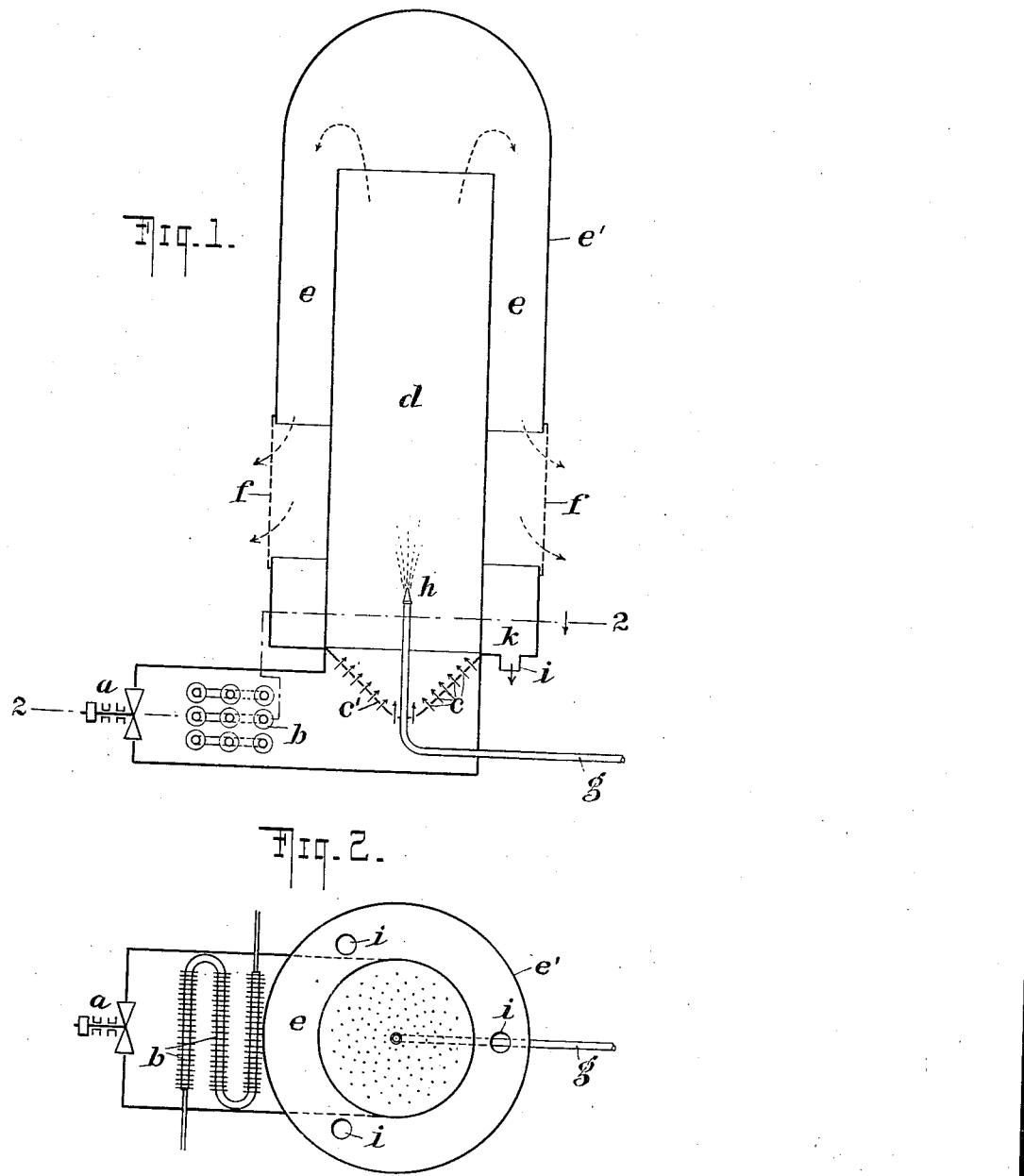
WITNESSES:
INVENTORS
PHILIPP SPRENGER
AEGIDIUS TSCHUDI
BY
ATTORNEYS

UNITED STATES PATENT OFFICE.

PHILIPP SPRENGER AND AEGIDIUS TSCHUDI, OF BASEL, SWITZERLAND, ASSIGNORS TO THE HOFFMANN-LA ROCHE CHEMICAL WORKS, OF NEW YORK, N. Y., A CORPORATION OF NEW YORK.

CASEIN CALCIUM AND PROCESS FOR PRODUCING THE SAME.

1,087,515.      Specification of Letters Patent.      Patented Feb. 17, 1914.

Application filed August 27, 1913. Serial No. 786,828.

*To all whom it may concern:*

Be it known that we, PHILIPP SPRENGER, a subject of the King of Prussia, and AEGIDIUS TSCHUDI, a citizen of Switzerland, residents of Basel, Switzerland, have jointly invented a certain new and useful Improvement in Casein Calcium and in the Process for Producing the Same, of which the following is a specification.

Our invention relates to the production of casein calcium for dietetic or pharmaceutical uses and has for its object the production of such casein calcium fit for such uses in the form in which it is readily soluble in water.

Underlying the present invention is the observation that the addition of casein calcium to milk diluted with an equal quantity of water will very materially enrich it in albumin and calcium oxid and that the milk so modified has special and important therapeutic and dietetic properties and is especially valuable for infants less than a year old. This observation is in itself founded upon a comparison between the chemical components of cows' milk as compared with the chemical components of a preparation known upon the market as albumin milk and prepared in accordance with the formula of Finkelstein and L. F. Meyer, a preparation which has proven to be extraordinarily effective. According to this comparison milk diluted with equal parts of water as compared with the same quantity of albumin milk contains ingredients in the following proportions:

|  | Milk. | Albumin milk. |
|---|---|---|
| Albumin | 15 g. | 30 g. |
| Fat | 17.5 g. | 25 g. |
| Sugar | 22.5 g. | 15 g. |
| $P_2O_5$ | 1.22 g. | 1.35 g. |
| CaO | 0.86 g. | 1.44 g. |

It is found that if about 2% of casein calcium (containing about 2½% of CaO) was added to the diluted milk, the net result is as follows:

| Albumin | 34.5 g. |
|---|---|
| Fat | 17.5 g. |
| Sugar | 22.5 g. |
| $P_2O_5$ | 1.22 g. |
| CaO | 1.36 g. |

The milk in this form greatly enriched in albumin and CaO approximates very closely the albumin milk. This observation having been made, it became important to produce a supply of casein calcium. This product as such cannot be purchased upon the market and such experiments as were made to produce it for regular or standard use, so that it could be incorporated in milk to be fed to patients, resulted at best in a milk-like casein calcium solution and the early experimenters were unable to bring this solution into a suitable and useful dry soluble condition. It was to solve this problem of creating casein calcium so that it should exist and be stable in the form of a dry but readily soluble powder capable of being shipped to the patient wherever he might reside, and of being used by him as required that we devoted ourselves.

In producing casein calcium in accordance with our process we begin by taking casein in as pure as possible a condition and stirring it in water. We then add a quantity of calcium hydrate, also as pure as possible, in such quantities as to render the resultant casein calcium neutral to the phenol phthalein test.

The reaction between the casein and the lime takes place most advantageously if the solution is stirred. In order that the solution shall not become too thick it is preferable that the calculated casein calcium contents of the solution shall not exceed 10% of it. This solution is then subjected to a special drying process which is advantageously carried out in the apparatus illustrated in the drawings in which—

Figure 1 is a diagrammatic vertical section and Fig. 2 a horizontal section through line 2—2 of Fig. 1.

In these drawings the blower $a$ forces fresh air past the heating devices $b$ illustrated as a steam radiator, through the numerous small holes $c$ at the bottom of the cylinder $d$. As the drawing shows, the air is forced with great velocity through the inverted cone-shaped bottom $c'$ of the cylinder $d$ and the jets of air enter the cylinder $d$ in angular directions with respect to the axis of the cylinder. The air passes to the top of the cylinder $d$ with diminishing velocity, passing into the annular space $e$ between the outer walls of the cylinder $d$ and the inner walls of the outer casing $e'$. The air is finally forced out through the filter $f$. The course of the air is shown by the arrows. The solution containing the casein calcium enters the apparatus through the tube $g$, being sprayed upwardly through the nozzle $h$ in the form of drops. The velocity of the stream of air in the cylinder $d$ at that point where the force of gravity overcomes the force of the pressure which injects the drops of liquid is not great enough to prevent the drops from falling so that these drops are not carried along in an upward direction by the column of air but fall gently toward the cone $c'$. As they approach this cone, the velocity of the air becomes more intense and prevents any of the drops from coming into contact with the surface of the cone. The great velocity of the streams of fresh air entering the cylinder and the direction which is given to these streams keeps the drops from touching the walls of the cylinder and again carries them in an upward direction after they have fallen a certain distance. The drops keep rising and falling in this fashion until they have lost so much weight by evaporation that the column of air in the cylinder $d$ is capable of carrying them along over the upper edge of the cylinder $d$ into the annular chamber $e$. The completely dried product, which is now in the form of a powder composed of relatively granular individual pieces is collected upon the filter $f$ from which it falls into the holder $k$, from which it can be removed through the opening $i$.

It is important to note in connection with this description of the apparatus and the process employed by the use of it that substances treated in accordance therewith are very delicately handled under conditions which avoid the employment of any degree of heat, such as is likely to affect injuriously the products under treatment. This prevents decomposition or chemical change. It is further to be noticed that the process avoids the production of very fine powders such, for instance, as can be produced by nebulizing the fluid to be evaporated in heated vacuum chambers or in heated air. That type of process, when employed in connection with substances like casein calcium, is not suitable for the reason that the powder if obtained in the condition of such extremely minute subdivision develops properties which are deleterious to the utility desired of the powder, such, for instance, as the property of being strongly electrical and the property of forming lumps when it is attempted to dissolve such powders which renders them insoluble. These fine powders, when examined, show that almost all of their characteristics which rendered them unsuitable for practical use were due to their finely divided condition. The discovery of this fact led us to seek a solution of a problem of increasing the size of the particles of the dried solution or emulsions. By enlarging the particles of the solution to be dried from the form of nebulization to the form of drops, it is found that the weight of the latter caused them to fall too rapidly so that they came into contact with the bottom of the receptacle while still in a wet condition, whereas the nebulized liquid fell so gently that the particles were sufficiently dried as they fell through the air column. In introducing the solution in the form of drops, the drying process becomes correspondingly longer to complete, since the relative amount of surface thus exposed to the evaporating action of the air is very materially decreased when the liquid is in the form of drops. It was then attempted to increase the length of the cylinder and to increase the velocity of the column of air passing upwardly through it, but a cylinder of this kind, to have the proper height, would have to be of dimensions which are quite impractical and furthermore the drops in such an elongated cylinder would have the tendency of coming into contact with the walls of the cylinder and to become pasted thereon. Furthermore, the tendency of a number of different drops to combine was greatly increased and this combination of drops resulted in a single drop of such weight that it could no longer be supported by the column of air, but fell to the bottom of the vessel and remained pasted there.

The final solution of the proper process to be employed was found in the use of apparatus such as above described in which the advantages of the drop form of evaporation are availed of in connection with a relatively wide cylinder of limited height, through the bottom of which the warmed air is introduced in a large number of streams of high velocity. When a 10% solution of casein calcium in water in subjected to this drying process, we obtain a dry relatively coarse granular powder easily soluble in water and completely soluble therein, this powder being also completely free of decomposition products.

The salient characteristic of the casein calcium as produced by the process above described will be found in the fact that it is readily soluble in water and in the form of a relatively loose granulated powder, as distinguished from a fine powder-like flour. It is a tasteless product of white color and has a neutral reaction on phenol phthalein. Casein calcium in this form is a producet new to commerce and has special advantages with respect to dietetic and therapeutic uses, as above explained. The preferred manner of employing it is, for instance, to stir 100 grams of the casein calcium with about one liter of fresh milk without heating it; at the same time about $1\frac{1}{2}$ liters of milk are brought to a boil. The two are then poured together and the total quantity is boiled for about five to ten minutes, being continuously stirred. At the end of this operation the liquid is strained through a fine sieve, such as a horse hair sieve, and is then mixed with an equal quantity of some special diluent to be prescribed by the physician in charge of the case. This diluent consists either of water or of a gruel or liquid produced from cooking flour or cereals. During the first days of use sugar should not be added, but later on sugar may be gradually added from one to five per cent. Preparations containing maltose, for example Soxhlet's sugar, are specially adapted for this purpose. In the case of many, but not all children, ordinary cooking sugar up to about $2\frac{1}{2}\%$ of the diluent can be used, but the use of milk sugar is under all circumstances to be avoided. The liquid should be consumed at intervals at least three hours apart, in quantities to be determined by the physician. In general it is preferable to begin with small quantities, but in that case to satisfy thirst, a plentiful supply of boiled water, or thin fennel tea without sugar, may be simultaneously offered.

What we claim is:

1. Casein calcium in the form of a white, tasteless, relatively coarse granular powder having a neutral reaction on phenol phthalein and being readily soluble in water or milk.

2. The process of producing casein calcium which consists in producing a casein calcium solution of approximately 10% and converting it into the form of a white, dry, stable, relatively coarse powder, readily soluble in water and milk, by drying the same in the form of drops and preventing said drops from coming into contact with the surface of the drying vessel until after the water is evaporated.

3. The process of producing casein calcium which consists in producing a casein calcium solution of approximately 10% and converting it into the form of a white, dry, stable, relatively coarse powder, readily soluble in water and milk, by drying the same in the form of drops and preventing said drops from coming into contact with the surface of the drying vessel until after the water is evaporated by exposing the drops to a column of warm air produced by a multiplicity of fine air jets of great velocity and suspending such drops therein until evaporation is completed.

In testimony whereof we have hereunto set our hands in the presence of two subscribing witnesses.

PHILIPP SPRENGER.
AEGIDIUS TSCHUDI.

Witnesses:
PETER METZGER,
HEINRICH KUBLI.